United States Patent [19]
Morrison

[11] 3,855,115

[45] Dec. 17, 1974

[54] AROMATIZATION PROCESS USING ZINC AND RHENIUM MODIFIED ZSM-5 CATALYST

[75] Inventor: Roger A. Morrison, W. Deptford Twsp., N.J.

[73] Assignee: Mobil Oil Corporation, New York, N.Y.

[22] Filed: Oct. 25, 1972

[21] Appl. No.: 300,546

[52] U.S. Cl......... 208/135, 208/DIG. 2, 252/455 Z, 260/673, 260/673.5
[51] Int. Cl.......................... C10g 35/06, C07c 5/22
[58] Field of Search ....... 208/135, DIG. 2; 260/673, 260/673.5; 252/455 Z

[56] References Cited
UNITED STATES PATENTS

| | | | |
|---|---|---|---|
| 3,175,967 | 3/1965 | Miale et al. | 208/120 |
| 3,700,585 | 10/1972 | Chen et al. | 208/111 |
| 3,709,979 | 1/1973 | Chu | 423/328 |
| 3,714,029 | 1/1973 | Berry | 208/111 |
| 3,729,409 | 4/1973 | Chen | 208/135 |
| 3,761,389 | 9/1973 | Rollmann | 260/673.5 |
| 3,767,568 | 10/1973 | Chen | 208/134 |

Primary Examiner—Delbert E. Gantz
Assistant Examiner—S. Berger
Attorney, Agent, or Firm—Andrew L. Gaboriault; Michael G. Gilman

[57] ABSTRACT

Improvements in the aromatization of hydrocarbons and in the alkylation of aromatic rings effected by contacting appropriate hydrocarbon feed streams with a ZSM-5 type of catalyst at prescribed temperature, pressure and space velocity conditions to convert the feed as required and desired, which improvements go to minimizing the production of polycyclic aromatics, particularly naphthalenes in the process and reducing coking of the catalyst during aromatization and/or alkylation by using as the catalyst a ZSM-5 type of crystalline aluminosilicate zeolite which has rhenium values deposited thereon and therein by ion exchange techniques.

9 Claims, No Drawings

AROMATIZATION PROCESS USING ZINC AND RHENIUM MODIFIED ZSM-5 CATALYST

This invention relates to improvements in the conversion of hydrocarbons to products having a higher proportion by weight of aromatics in a manner so as to limit the production of polycyclic, particularly naphthalenic, aromatics and/or coke.

There has recently been discovered a new family of processes for upgrading various petroleum fractions into very high octane motor fuel blendstock in good yields. In general, these processes contact given petroleum hydrocarbon fractions with a ZSM-5 type of alumino silicate zeolite catalyst under given temperature, pressure and space velocity reaction conditions. In one catalytic conversion, it is preferred to produce new aromatic rings from aliphatic compounds by operating at severities of at least about 90 percent conversion of the non-aromatic portion of the feedstock so as to yield at least 30 weight percent, based on this non-aromatics portion of the feed, of aromatics in the product.

In another catalytic conversion, a feedstock containing a significant proportion of aromatic rings is contacted with a ZSM-5 type of zeolite molecular sieve catalyst under appropriate temperature, pressure and space velocity conditions so as to achieve alkylation of the aromatic rings by liquids obtained from the non-aromatic portion of the feed.

Both the aromatization reaction and the alkylation reactions referred to herein as occurring in contact with a ZSM-5 catalyst are per se known processes in which invention is not here claimed.

The catalyst used for these known processes has been stated to be a ZSM-5 type of catalyst which includes ZSM-5, ZSM-8, ZSM-11, ZSM-12 and other similarly behaving zeolites.

ZSM-5 is disclosed and claimed in copending application Ser. No. 865,472, filed Oct. 10, 1969, now U.S. Pat. No. 3,702,886; ZSM-8 is disclosed and claimed in copending application Ser. No. 865,418, filed Oct. 10, 1969, now abandoned and ZSM-11 is disclosed and claimed in copending application Ser. No. 31,421, filed Apr. 23, 1970, now U.S. Pat. No. 3,709,979.

The family of ZSM-5 compositions has the characteristic x-ray diffraction pattern set forth in Table 3 hereinbelow ZSM-5 compositions can also be identified, in terms of mole ratios of oxides, as follows:

0.9 ± 0.2 $M_{2/n}O$: $W_2O_3$: b $YO_2$: z $H_2O$ wherein M is a cation, n is the valence of said cation, W is selected from the group consisting of aluminum and gallium, Y is selected from the group consisting of silicon and germanium, z is from 0 to 40 and b is at least 5 and preferably 15–300. In a preferred synthesized form, the zeolite has a formula, in terms of mole ratios of oxides, as follows:

0.9 ± 0.2 $M_{2/n}O$ : $Al_2O_3$ : 15–100 $SiO_2$ : z $H_2O$ and M is selected from the group consisting of a mixture of alkali metal cations, especially sodium, and tetraalkylammonium cations, the alkyl groups of which preferably contain 2–5 carbon atoms.

In a preferred embodiment of ZSM-5, W is aluminum, Y is silicon and the silica/alumina mole ratio is at least 15, preferably at least 30.

Members of the family of ZSM-5 zeolites which include ZSM-5, ZSM-8 and ZSM-11 possess a definite distinguishing crystalline structure whose x-ray diffraction pattern shows the following significant lines:

TABLE 3

| Interplanar Spacing d(A) | Relative Intensity |
|---|---|
| 11.1 ± 0.3 | S |
| 10.0 ± 0.25 | S |
| 7.4 ± 0.2 | W |
| 7.1 ± 0.15 | W |
| 6.3 ± 0.1 | W |
| 6.04 ± 0.1 | W |
| 5.97 ± 0.1 | W |
| 5.56 ± 0.1 | W |
| 5.01 ± 0.1 | W |
| 4.60 ± 0.08 | W |
| 4.25 ± 0.08 | W |
| 3.85 ± 0.07 | VS |
| 3.71 ± 0.05 | S |
| 3.64 ± 0.05 | M |
| 3.04 ± 0.04 | W |
| 2.99 ± 0.03 | W |
| 2.94 ± 0.02 | W |

These values, as well as all other x-ray data were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these the relative intensities, 100 $I/I_o$, where $I_o$ is the intensity of the strongest line or peak, and d(obs.), the interplanar spacing in A, corresponding to the recorded lines, were calculated. In Table 3 the relative intensities are given in terms of the symbols S = strong, M = medium, MS = medium strong, MW = medium weak and VS = very strong. It should be understood that this x-ray diffraction pattern is characteristic of all the species of ZSM-5 compositions. Ion exchange of the sodium ion with cations reveals substantially the same pattern with some minor shifts in interplanar spacing and variation in relative intensity. Other minor variations can occur, depending on the silicon to aluminum ratio of the particular sample, as well as if it has been subjected to thermal treatment.

Zeolite ZSM-5 can be suitably prepared by preparing a solution containing water, tetrapropyl ammonium hydroxide and the elements of sodium oxide, an oxide of aluminum or gallium and an oxide of silica, and having a composition, in terms of mole ratios of oxides, falling within the following ranges:

TABLE 4

| | Broad | Preferred | Particularly Preferred |
|---|---|---|---|
| $OH^-/SiO_2$ | 0.07–1.0 | 0.1–0.8 | 0.2–0.75 |
| $R_4N^+/(R_4N^+Na^+)$ | 0.2–0.95 | 0.3–0.9 | 0.4–0.9 |
| $H_2O/OH^-$ | 10–300 | 10–300 | 10–300 |
| $YO_2/W_2O_3$ | 5–100 | 10–60 | 10–40 | wherein R is propyl, W is aluminum and Y is silicon. This mixture is maintained at reaction conditions until the crystals of the zeolite are formed. Thereafter the crystals are separated from the liquid and recovered. Typical reaction conditions consist of a temperature of from about 75°C to 175°C for a period of about 6 hours to 60 days. A more preferred temperature range is from about 90° to 150°C, with the amount of time at a temperature in such range being from about 12 hours to 20 days.

The digestion of the gel particles is carried out until crystals form. The solid product is separated from the reaction medium, as by cooling the whole to room temperature, filtering and water washing.

ZSM-5 is preferably formed as an aluminosilicate. The composition can be prepared utilizing materials which supply the elements of the appropriate oxide. Such compositions include, for an aluminosilicate, sodium aluminate, alumina, sodium silicate, silica hydrosol, silica gel, silicic acid, sodium hydroxide and tetrapropylammonium hydroxide. It will be understood that each oxide component utilized in the reaction mixture for preparing a member of the ZSM-5 family can be supplied by one or more initial reactants and they can be mixed together in any order. For example, sodium oxide can be supplied by an aqueous solution of sodium hydroxide, or by an aqueous solution of sodium silicate; tetrapropylammonium cation can be supplied by the bromide salt. The reaction mixture can be prepared either batchwise or continuously. Crystal size and crystallization time of the ZSM-5 composition will vary with the nature of the reaction mixture employed.

ZSM-8 can also be identified, in terms of mole ratios of oxides, as follows:

$0.9 \pm 0.2\ M_{2/n}O : Al_2O_3 : 15-300\ SiO_2 : z\ H_2O$ wherein M is at least one cation, n is the valence thereof and z is from 0 to 40. In a preferred synthesized form, the zeolite has a formula, in terms of mole ratios of oxides, as follows:

$0.9 \pm 0.2\ M_{2/n}O : Al_2O_3 : 15-60\ SiO_2 : z\ H_2O$ and M is selected from the group consisting of a mixture of alkali metal cations, especially sodium, and tetraethylammonium cations.

Zeolite ZSM-8 can be suitably prepared by reacting a water solution containing either tetraethylammonium hydroxide or tetraethylammonium bromide together with the elements of sodium oxide, aluminum oxide, and an oxide of silica.

The operable relative proportions of the various ingredients have not been fully determined and it is to be immediately understood that not any and all proportions of reactants will operate to produce the desired zeolite. In fact, completely different zeolites can be prepared utilizing the same starting materials depending upon their relative concentration and reaction conditions as is set forth in U.S. Pat. No. 3,308,069. In general, however, it has been found that when tetraethylammonium hydroxide is employed, ZSM-8 can be prepared from said hydroxide, sodium oxide, aluminum oxide, silica and water by reacting said materials in such proportions that the forming solution has a composition in terms of mole ratios of oxides falling within the following ranges:

$SiO_2/Al_2O_3$ — from about 10 to about 200

$Na_2O$/tetraethylammonium hydroxide — from about 0.05 to 0.020

Tetraethylammonium hydroxide/$SiO_2$ — from about 0.08 to 1.0

$H_2O$/tetraethylammonium hydroxide — from about 80 to about 200

Thereafter, the crystals are separated from the liquid and recovered. Typical reaction conditions consist of maintaining the foregoing reaction mixture at a temperature of from about 100°C to 175°C for a period of time of from about 6 hours to 60 days. A more preferred temperature range is from about 150° to 175°C with the amount of time at a temperature in such range being from about 12 hours to 8 days.

ZSM-11 can also be identified, in terms of mole ratios of oxides, as follows:

$0.9 \pm 0.3\ M_{2/n}O : Al_2O_3 : 20-90\ SiO_2 : z\ H_2O$ wherein M is at least one cation, n is the valence thereof and z is from 6 to 12. In a preferred synthesized form, the zeolite has a formula, in terms of mole ratios of oxides, as follows:

$0.9 \pm 0.3\ M_{2/n}O : Al_2O_3 : 20-90\ SiO_2 : z\ H_2O$ and M is selected from the group consisting of a mixture of alkali metal cations, especially sodium, and tetrabutylammonium cations.

ZSM-11 can be suitably prepared by preparing a solution containing $(R_4X)_2O$, sodium oxide, an oxide of aluminum or gallium, an oxide of silicon or germanium and water and having a composition, in terms of mole ratios of oxides, falling within the following ranges:

| | Broad | Preferred |
|---|---|---|
| $\dfrac{YO_2}{WO_2}$  | 10–150 | 20–90 |
| $\dfrac{Na_2O}{YO_2}$  | 0.05–0.7 | 0.05–0.40 |
| $\dfrac{(R_4X)_2O}{YO_2}$ | 0.02–0.20 | 0.02–0.15 |
| $\dfrac{H_2O}{Na_2O}$ | 50–800 | 100–600 | wherein $R_4X$ is a cation of a quaternary compound of an element of Group 5A of the Periodic Table, W is aluminum or gallium and Y is silicon or germanium maintaining the mixture until crystals of the zeolite are formed. Preferably, crystallization is performed under pressure in an autoclave or static bomb reactor. The temperature ranges from 100°C–200°C generally, but at lower temperatures, e.g. about 100°C, crystallization time is longer. Thereafter the crystals are separated from the liquid and recovered. The new zeolite is preferably formed in an aluminosilicate form.

An embodiment of this catalyst resides in the use of a porous matrix together with the ZSM-5 type family of zeolite previously described. The zeolite can be combined, dispersed, or otherwise intimately admixed with the porous matrix in such proportions that resulting products contain from 1 to 95 percent by weight and preferably from 10 to 70 precent by weight of the zeolite in the final composite.

The term "porous matrix" includes organic compositions with which the zeolites can be combined, dispersed or otherwise intimately admixed wherein the matrix may be catalytically active or inactive. It is to be understood that the porosity of the composition employed as a matrix can be either inherent in the particular material or it can be introduced by mechanical or chemical means. Representative of matrices which can be employed include metals and alloys thereof, sintered metals, and sintered glass, asbestos, silicon carbide, aggregates, pumice, firebrick, diatomaceous earths, alumina and inorganic oxides. Inorganic compositions, especially those comprising alumina and those of a siliceous nature are preferred. Of these matrices inorganic oxides such as clay, chemically treated clays, silica, silica alumina, etc. as well as alumina, are particularly preferred because of their superior porosity, attrition resistance and stability.

Techniques for incorporating the ZSM-5 type family of zeolites into a matrix are conventional in the art and are set forth in U.S. Pat. No. 3,140,253.

It is to be noted that when a ZSM-5 type zeolite is used in combination with a porous matrix, space velocities which may be set forth as parameters for this process are based on the ZSM-5 type zeolite alone and the porous matrix is ignored. Thus, whether a ZSM-5 type zeolite is used alone or in a porous matrix, the space velocities in all cases refer to the ZSM-5 type component.

It is known that zeolites, particularly synthetic zeolites can have their composition modified by impregnating certain metals thereonto and/or thereinto. The composition can also be modified by exchanging various anions and/or cations into the crystal structure of the zeolite, replacing more or less of the ions originally present upon production of the zeolite.

The ZSM-5 type family of zeolites have been found to be especially active for aromatization if they have at least a portion of the original cations associated therewith replaced by any of a wide variety of other cations according to techniques well known in the art. Typical replacing cations would include hydrogen, ammonium and metal cations, including mixtures of the same. Of the replacing cations, preference is given to cations of hydrogen, ammonium, cadmium, bismuth, tin, rare earth, magnesium, zinc, calcium, nickel, and mixtures thereof. Particularly effective members of the ZSM-5 type family of zeolites are those which have been base exchanged with hydrogen ions, ammonium ions, zinc ions or mixtures thereof. Most specifically zinc or cadmium ZSM-5 are the best presently known catalysts for aromatizations as set forth.

Typical ion exchange techniques would be to contact a ZSM-5 type of zeolite with a salt of the desired replacing cation or cations. Although a wide variety of salts can be employed, particular preference is given to chlorides, nitrates and sulfates.

Representative ion exchange techniques are disclosed in a wide variety of patents, including U.S. Pat. Nos. 3,140,249; 3,149,251; and 3,140,253.

It is also within the scope of the aromatization process to which this application is directed to incorporate a desired metallic component onto the ZSM-5 type family of zeolites by techniques other than ion exchange. Thus, for example, it is possible to impregnate a desired metallic component, such as zinc, zinc-copper, platinum or palladium, thereinto by conventional impregnation techniques, as well as merely depositing the elemental metal onto the particular zeolite and in some cases, such as with zinc oxide, to incorporate the metal by physical admixture of the zeolite with an insoluble metal compound.

In any event, following contact with a salt solution of the desired replacing cation, the zeolites are preferably washed with water and dried at a temperature ranging from 150° to about 600°F and thereafter heated in air or inert gas at temperatures ranging from about 500°F to 1500°F for periods of time ranging from 1 to 48 hours or more. It is noted that this heat treatment can be carried out in situ, i.e. while the particular aromatization reaction is taking place, but it is preferred to carry it out as a separate step prior to carrying out the aromatization reaction.

The processes to which this invention is directed comprise contacting a feed material containing paraffins and/or olefins and/or naphthenes, which may have admixed therewith a given proportion of aromatics, with a ZSM-5 type of crystalline aluminosilicate. If it is desired to increase the proportion of aromatic rings in the product of this process as compared to the feed thereto, the process will be carried out under relatively severe conditions of about 800° to 1500°F, up to about 35 atmospheres absolute pressure and space velocities of about 1 to 15 WHSV under such combination of conditions that at least 30 pounds of compounds containing new aromatic rings are produced per 100 pounds of the non-aromatic portion of the feed material which is charged. If it is desired to increase the weight proportion of aromatics in the product as compared to the feed without producing a significant number of new aromatic rings, this can be accomplished by contacting a hydrocarbon feed as noted above with a ZSM-5 type of zeolite catalyst under milder conditions that the aromatization conditions set forth above. These conditions include a temperature of about 500° to 800°F, a space velocity of about 0.1 to 5 WHSV and a pressure up to about 35 atmospheres absolute.

The above referred to aromatization process is carried out in the substantial absence of added hydrogen that is, hydrogen is produced as a product of the aromatization process and therefore is present during the aromatization reaction. However, hydrogen is not separately fed to the aromatization reaction. The second referred to process catalyzed by the presence of ZSM-5 type of catalyst, that is cracking of aliphatic components of the feed and alkylating existing aromatic rings with the fragments of such cracking, can be carried out in the presence or absence of added hydrogen.

In a preferred embodiment of these processes, increase in aromatic content corresponding to conversions in amounts greater than 40 and 50 weight percent based on the feed material charged is possible. It should become immediately apparent that the process to which this invention is directed does not rely upon a reaction which has academic interest only, but rather, is directed towards producing aromatic compounds at high selectivities in commercial quantities.

The feed material which is employed in the novel process of this invention may comprise a $C_2$ to $C_4$ light gas stream, which may be miixed olefins and paraffins, or the like, or liquid paraffins, olefins, naphthenes, and mixtures thereof which have a boiling point in the range of from $C_5$ up to those fractions wherein at least 50 volume percent boils no higher than 250°F. The preferred feed material are those liquid hydrocarbons which have a boiling point of from $C_5$ through 210°F.

In general, the preferred feed materials which are employed are those which are predominantly of low octane value and have a comparatively low economic value. This process allows them to be upgraded into aromatics or the aromatics proportion thereof increased which obviously enhance their octane value and therefore their economic importance. Also there can be used higher octane charge stocks such as light or full range reformate in order to further increase the octane value thereof. Additionally, the composition of the feed material is also important from another point of view and that is the optimization of the aromatic compounds which are produced. In this connection, the novel process of this invention is a highly endothermic one which means that a considerable expense is required in order to impart heat thereto. The maximum utilization of the heat energy required to preheat the feed material occurs when the charge material is composed essentially of those elements which are capable of being aromatized. In this connection, it is to be specifically noted that aromatic rings are not substantially altered under the reaction conditions contemplated for these processes, except as noted to alkylate them. Particularly $C_8^-$ aromatic compounds present in the feed material tend to act as a diluent and pass through the process of this invention unchanged.

In the aromatization reactions referred to above, it might appear that it would be an economic liability to have aromatics present in the feed material for the simple reason that energy would have to be expended in order to heat said aromatics to aromatization temperatures. On the other hand, aromatic rings in the feed are necessary to that process where the proportion of aromatics is increased through alkylation of such rings. Thus, the expression consisting essentially of paraffins, and/or olefins and/or naphthenes, as used through this specification and claims, is intended to include feedstocks which contain some aromatics.

Typical refinery feedstocks which can be utilized in this process include Udex raffinates, coker gasoline, light F.C.C gasoline, light naphthas, $C_5$ to $C_7$ fractions of straight run naphthas, reformates, reformer effluent and pyrolysis gasoline.

The aromatization process to which this invention is directed is carried out by contacting a feed material, above described, with a ZSM-5 type zeolite under conditions of space velocity and temperature such that at least 30 weight percent of the non-aromatic portion of the charge stock is converted to compounds containing new aromatic rings. Along with the temperature of 800° to 1500°F, the space velocity at which this reaction is carried out is a critical parameter from a practical point of view. Low in space velocities which must be used are from 1 to 15 WHSV.

This aromatization process is operable at pressures ranging from atmospheric pressure up to about 35 atmospheres. It is possible to carry out this reaction at pressures higher than 35 atmospheres but such would require the use of expensive high pressure equipment which would tend to detract from the overall economics of operation.

Additionally, if a moving catalyst bed is used then the space velocities employed are those which give contact times equivalent to those which are obtained at space velocities of 1 to 15 WHSV for a fixed bed. These relationships are well known in the art.

However, the most preferred embodiment of this aromatization process is operating at a pressure of 1 to 10 atmospheres and a space velocity of 1 to 10 WHSV. The temperature at which the process is carried out is important and is dependent to a large extent upon the particular composition of the feed material which is being charged to the catalyst. It has been discovered that there are certain minimum critical temperatures which must be employed in order to obtain the desired reaction and that these minimum temperatures have absolutely nothing to do with the concept of percent of conversion of the feed material but have everything to do with the selectivity of the conversion of the feed material to aromatics. It has been discovered that for high conversion, that is upwards of 90 percent, if a feedstock contains at least 35 weight percent of olefins, than the minimum critical temperature which must be employed is 650°F. If the feed material contains less than 35 weight percent of olefins, then the minimum temperature which must be employed is 850°F.

The upper limit of temperature is not narrowly critical and any practical upper maximum can be used which does not present problems with respect to heat input nor drive the reaction so far that the thermal cracking overrides the catalytic reforming conversion. In this connection, it has been found that a practical upper limit of temperature is about 1400°F. It is preferred, however, to carry out the conversion of those liquid hydrocarbon feedstocks having a paraffin content of at least 65 weight percent at temperatures ranging from about 900° to 1200°F. For feed materials containing less than 65 percent paraffins, the preferred temperatures may be lower, ranging from about 750° to about 1200°.

Another important process parameter is carrying out this aromatization reaction in the absence of substantial added hydrogen. For reasons which are not completely understood, it appears that the addition of hydrogen in substantial amounts affects the ability of the ZSM-5 type catalyst to catalyze the aromatization reactions so that an overall diminution of the catalytic activity of these materials is experienced. Therefore, it is definitely preferred in carrying out the process that no added hydrogen be employed. It is to be immediately noted that hydrogen is a by-product of the aromatization reaction and therefore there is always some hydrogen present during the course of the reaction. The hydrogen which is formed during the reaction does not seem to be adverse to the aromatization reaction. The aforementioned diminution in activity is apparent only when substantial amounts of hydrogen are added. It might very well be that the desire to minimize coke formation on the catalyst will dictate addition of small quantities of hydrogen. While this is not preferred, it is accepted where necessary.

This newly developed aromatization process has proven to be quite unique and quite useful in oil refinery processing, having as its principal function to produce high octane high aromatics gasoline. It is also quite useful for producing chemical grade aromatic compounds. However, it also produces significant quantities of fused ring aromatics, particularly undesired naphthalenes which, although they have high octane numbers, are detrimental to commercial gasoline.

ZSM-5 type of aluminosilicate molecular sieve used in the processes described herein has the tendency to have coke deposit thereon during these processes. The deposition of coke tends to deactive the catalyst and with time the ZSM-5 catalyst will have to be removed from the reaction system and regenerated by removing the coke deposited thereon. This is often accomplished by burning off the coke and thereby heating the solid catalyst particles sufficient to contribute some or all of the heat required to sustain the endothermic aromatization and/or alkylation reactions preferred to above. While a heat balance can possibly be achieved in this fashion, repeated regeneration of the coked catalyst will eventually inactivate it completely or at least sufficiently to reduce its efficiency to the point of making its use uneconomical. It is therefore desirable to eliminate, reduce or at least slow down the deposition of coke on the ZSM-5 catalyst during the aromatization and/or alkylation reactions set forth above.

It is therefore an object of this invention to provide a novel means of modifying a ZSM-5 type of catalyst.

It is another object of this invention to provide a novel process for aromatizing aliphatic hydrocarbons using a ZSM-5 type of catalyst.

It is a further object of this invention to provide a novel process for alkylating existing aromatic rings using a ZSM-5 type of catalyst.

It is still another object of this invention to improve such processes as are set forth above by reducing the production of polycyclic aromatics, particularly naphthalene, thereby.

It is a still further object of this invention to improve such processes as are set forth above by reducing the deposition of coke on the ZSM-5 type of catalyst.

Other and additional objects of this invention will become apparent from a consideration of this entire specification including the claims thereof.

In accord with and fulfilling these objects, one aspect of this invention resides in a novel ZSM-5 type of catalyst which is a ZSM-5 aluminosilicate zeolite as described above which additionally contains rhenium incorporated therein by ion exchange techniques and which may also contain a second metal deposited thereon and/or incorporated therein by ion exchange and/or impregnation. Put another way, the catalyst of this invention consists essentially of a bonded or unbonded ZSM-5 synthetic aluminosilicate molecular sieve zeolite, having rhenium exchanged thereonto and thereinto and which possibly has a second metal such as zinc thereon and/or therein.

Where the ZSM-5 catalyst, having rhenium exchanged thereinto and thereonto, is HZSM-5, the rhenium is deposited by exchange in the conventional manner in accord with the techniques set forth above. However, where a second metal such as zinc is included by exchange in the ZSM-5 in addition to the rhenium, it is essential that the zinc be deposited into and onto the ZSM-5 zeolite before or at the same time as exchanging with rhenium. The zinc may be impregnated into and onto the ZSM-5 or exchanged thereinto by conventional techniques well known in the art. In this case, the zinc impregnation may be before or after the rhenium exchange, preferably after the rhenium exchange. No invention is claimed in the impregnation and/or exchange techniques disclosed therein. The specific combination of these per se known techniques as set forth herein, however, result in a unique situation which is indeed beyond the scope of the prior art.

It has surprisingly been found that the above defined catalyst has most unusual properties in relation to the properties of ZSM-5 type of zeolites alone or ZSM-5 type zeolites modified with zinc. Thus, HZSM-5 is capable of catalyzing the aromatization of aliphatic compounds or the alkylation of aromatic rings as aforesaid. Zinc modified ZSM-5 is much more efficient at dehydrocyclizing aliphates (converting aliphatics to aromatics), improvements on the order of 40 percent in aromatics yield being quite common. However, both HZSM-5 and Zn ZSM-5 type catalysts tend to produce fused ring aromatics, particularly naphthalenes as part of their product mix in greater or lesser proportions. In fact, zinc modified ZSM-5 shows as much as 100 percent increase in naphthalene production over unmodified HZSM-5; so that while the yield of aromatics achieved by zinc ZSM-5 dramatically improved, some of this improvement is negated by the co-production of the undesired naphthalenic materials, particularly the alkyl substituted naphthalenes.

The naphthalenic products are undesirable for several reasons. Of the utmost importance is the fact that the principal purpose of reforming aliphatics to aromatics with ZSM-5 type of catalysts is to increase their utility as gasoline (motor fuels). Monocyclic aromatics are quite useful in this regard because of their high octane number. Naphthalenes and other condensed ring aromatics are disadvantageous because they are steps on the road from aliphatics or aromatics toward coke. They have high boiling ranges and thus increase the boiling range of gasoline containing them. Therefore it is important, and, in view of recent ecological trends perhaps even necessary, to remove these higher boiling components from the aromatized product. Removal of heavy ends, naphthalenic or otherwise, is usually accomplished by distillation. Subjecting the upgraded, aromatic product to distillation to remove heavy ends not only is an expensive, and therefore economically undesirable, additional process step, but it also tends to degrade various components of the product due to the heat input required in the distillation.

The novel catalysts of this invention, ZSM-5 type zeolite modified with rhenium, effectively catalyze the aromatization of aliphatics to an acceptable extent not substantially less than HZSM-5 alone and they have the amazing ability to somehow limit the dehydrocyclization so as to form substantially no or few fused ring aromatics.

The presence of rhenium in the ZSM-5 type zeolite does not seem to significantly adversely affect the ability of the zeolite to catalyze the conversion of aliphatics to compounds containing new aromatic rings and to catalyze the alkylation of existing or new aromatic ring with fragments created by such catalyst by inducing the cracking of aliphatics. This is also true with zinc modified ZSM-5 type of zeolites.

The following Examples substantiate this fact. These Examples illustrate rather than circumscribe this invention. Parts and percentages are by weight unless expressly stated to the contrary.

EXAMPLE 1

A Udex raffinate having the following compositions in weight percent:

| | |
|---|---|
| 85.4 | paraffins |
| 2.3 | monoolefins |
| 4.6 | naphthenes |
| 7.7 | aromatics | was contacted with a fixed bed ZSM-5 catalyst operated at 1000°F at atmospheric pressure. The feed was passed through the bed at a space velocity of 1 WHSV and produced a product having the following composition in weight percent:

| | |
|---|---|
| $C_1$ | 11.6 |
| $C_2$ | 12.4 |
| $C_3$ | 11.7 |
| n-$C_4$ | 0.1 |
| $C_8$ paraffins | 0.4 |
| benzene | 18.2 |
| toluene | 26.2 |
| $C_8$ aromatics | 17.8 |
| $C_9$ aromatics | 0.7 |
| naphthalenes | 0.5 |

EXAMPLE 2

The process of Example 1 was repeated with a similar feed but using a ZSM-5 catalyst having about 1 percent by weight rhenium exchanged thereinto. The feed was converted to an extent of 94.1 percent with an aromatics yield of 42.9 percent. No detectable naphthalenes were found in the product.

EXAMPLE 3

Example 2 was repeated with the same feed and the same operating conditions but using unmodified HZSM-5 catalyst. The conversion was 94 percent with an aromatics yield of 37.5 percent and a naphthalene proportion in the product of 1.6 percent.

EXAMPLE 4

Examples 2 and 3 were repeated with the same feed and under the same conditions but using a ZSM-5 catalyst containing 1 weight percent zinc. The conversion was 94.7 percent; the aromatics yield was 50.9 percent; and the naphthalene content of the product was 3.7 percent.

These data clearly support the proposition that while zinc ZSM-5 is a better aromatization catalyst than unmodified HZSM-5, it also makes more undesirable naphthalenes. Rhenium modified ZSM-5, on the other hand, also improves the aromatization production as compared to unmodified HZSM-5, but surprisingly additionally surpresses the formation of naphthalenes.

Another aspect of this invention resides in combining the excellent properties of both the zinc and the rhenium modifications of ZSM-5 type zeolite catalyst. In this aspect of this invention, the aromatization reaction is carried out in the presence of a ZSM-5 catalyst which has been modified by the addition of both zinc and rhenium. The aromatics yields with this doubly modified catalyst have been found to be equivalent to those obtained with zinc modified ZSM-5 type zeolite alone coupled with surpression of naphthalene formation. The following example illustrates this aspect of this invention:

EXAMPLE 5

A Udex raffinate similar in composition to that used in Examples 1–4 was passed through a ZSM-5 catalyst having been zinc and rhenium exchanged, containing about 0.4 percent and about 0.4 percent zinc, at 1000°F, WHSV and atmospheric pressure. The conversion was 100 percent of the paraffin-olefin content of the charge. The aromatics yield was 56.4 percent and contained 0.5 percent naphthalenes.

According to this invention, the rhenium without added zinc can be deposited into and onto a ZSM-5 catalyst by standard cation exchange treatment. The proportion of original cation (usually sodium) of the ZSM-5 exchanged to rhenium is about 7 to 100 percent giving a modified catalyst of up to about 1 weight percent rhenium, the rest being aluminosilicate zeolite.

In that aspect of this invention where both rhenium and zinc are incorporated in a ZSM-5 type of catalyst, the zinc can be exchanged into the catalyst before or at the same time as the rhenium. The zinc can alternatively be impregnated before or after rhenium is exchanged into the ZSM-5, preferably after rhenium exchange thereinto. The total added metal proportion is about 0.1 to 5.0 weight percent and the ratio of rhenium to zinc is about 0.05 to 5. Although zinc has been specifically referred to and exemplified as the "second metal" in the catalyst of this invention, it is to be considered as illustrative of a small group of metals which will serve this purpose, namely, zinc, cadmium, bismuth, zinc-copper and tin.

What is claimed is:

1. In the processing of a feed of $C_2$ to 400°F hydrocarbon compounds by containing such with a ZSM-5 type of synthetic aluminosilicate zeolite catalyst, having a silica to alumina ratio of at least about 15, having been made utilizing an organic cation, having zinc incorporated thereinto, and having the ability to significantly increase the aromatics content of said hydrocarbon feed at about 500° to 1500°F and a WHSV of about 0.1 to 15 under conditions sufficient to significantly increase the weight proportion of aromatics in the product as compared to the feed; the improvement, whereby reducing the production of naphthalenes and reducing coke formation on the catalyst during such processing, which comprises using as said catalyst said zeolite incorporating said zinc modified by the exchange of rhenium thereinto.

2. The improved process claimed in claim 1 carried out at at least atmospheric pressure and using as said catalyst a zeolite which is shape selective for monomethyl substituted paraffins and smaller diameter molecules.

3. The improved process claimed in claim 2 wherein said zeolite is a member selected from the group consisting of ZSM-5, ZSM-11, and ZSM-12 aromatizing zeolites.

4. The improved process claimed in claim 3 carried out at 500° to 800°F, 0.1 to 5 WHSV and with aromatic components in the feed under such combination of conditions as to increase the proportion of aromatics in the product as compared to the feed by fragmenting aliphatic components in said feed and alkylating existing aromatic ring therein with said aliphatic fragments.

5. The improved process claimed in claim 3 wherein said feed contains paraffins, olefins, naphthenes and aromatics.

6. The improved process claimed in claim 3 wherein said feed is at least one member selected from the group consisting of coker gasoline, Udex raffinate, reformate, reformer effluent, pyrolysis gasoline and naphtha.

7. The improved process claimed in claim 3 wherein the proportion of said zinc is 0.1 to 5 weight percent.

8. The improved process claimed in claim 3 wherein the ratio of rhenium to zinc is about 0.05 to 5.

9. The improved process claimed in claim 3 carried under conditions of 800° to 1500°F, 1 to 15 WHSV and in the absence of added hydrogen sufficient to convert at least about 90 percent of said feed to a product containing at least about 30 grams of new aromatic components per 100 grams of aliphatic feed.

* * * * *

UNITED STATES PATENT OFFICE
CERTIFICATE OF CORRECTION

Patent No. 3,855,115      Dated December 17, 1974

Inventor(s)    Roger A. Morrison

It is certified that error appears in the above-identified patent and that said Letters Patent are hereby corrected as shown below:

| | |
|---|---|
| Column 4, line 53 | "organic" should be --inorganic-- |
| Column 5, line 34 | "specifically" should be --especially-- |
| Column 6, line 21 | "that" should be --than-- |
| Column 6, line 47 | "MIIXED" should be --mixed-- |
| Column 8, line 54 | "deactive" should be --deactivate-- |
| Column 10, line 22 | "in" should be --is-- |

CONTINUED

PO-1050
(5/69)

UNITED STATES PATENT OFFICE
CERTIFICATE OF CORRECTION

Patent No. 3,855,115      Dated December 17, 1974

Inventor(s) ROGER A. MORRISON

It is certified that error appears in the above-identified patent and that said Letters Patent are hereby corrected as shown below:

| | |
|---|---|
| Column 11, line 49 | After "percent" -- rhenium-- should be inserted. |
| Column 11, line 50 | After "F," --1-- should be inserted. |
| Column 12, line 14 | "Containing" should be --contacting--. |

Signed and sealed this 29th day of April 1975.

(SEAL)
Attest:

RUTH C. MASON
Attesting Officer

C. MARSHALL DANN
Commissioner of Patents
and Trademarks